United States Patent
Glance

Patent Number: 5,253,924
Date of Patent: Oct. 19, 1993

[54] BLOW MOLDED SEAT BACK WITH INTEGRAL REINFORCING MEMBER

[75] Inventor: Patrick M. Glance, Plymouth, Mich.

[73] Assignee: Concept Analysis Corporation, Plymouth, Mich.

[21] Appl. No.: 713,762

[22] Filed: Jun. 11, 1991

[51] Int. Cl.$^5$ .......................................... A62D 35/00
[52] U.S. Cl. ............................ 297/452.1; 297/216.13; 297/483
[58] Field of Search ................ 297/216, 483, 452, 468

[56] References Cited

U.S. PATENT DOCUMENTS

| | | | |
|---|---|---|---|
| 3,695,696 | 10/1972 | Lohr et al. | 297/452 X |
| 4,585,273 | 4/1986 | Higgs et al. | 297/468 X |
| 4,749,231 | 6/1988 | Cremer et al. | 297/483 X |
| 4,993,778 | 2/1991 | Colin et al. | 297/452 |
| 5,020,856 | 6/1991 | George | 297/483 |
| 5,048,894 | 9/1991 | Miyajima et al. | 297/452 X |

*Primary Examiner*—Peter R. Brown
*Attorney, Agent, or Firm*—Waters & Morse

[57] ABSTRACT

A vehicle seat back comprises a blow molded body with a reinforcing beam extending upwardly along at least one side of the body. The lower extremity of this beam is secured to the base structure of the seat. The upper extremity of the beam can from a mounting point for a shoulder harness belt terminal. Crash forces on the seat back and seat belt shoulder harness are thus transmitted through the reinforcing structure to the vehicle frame without involving the relatively weak molded or fabricated conventional frame components of the seat frame to create a low mass, structural restraint seat system.

15 Claims, 3 Drawing Sheets

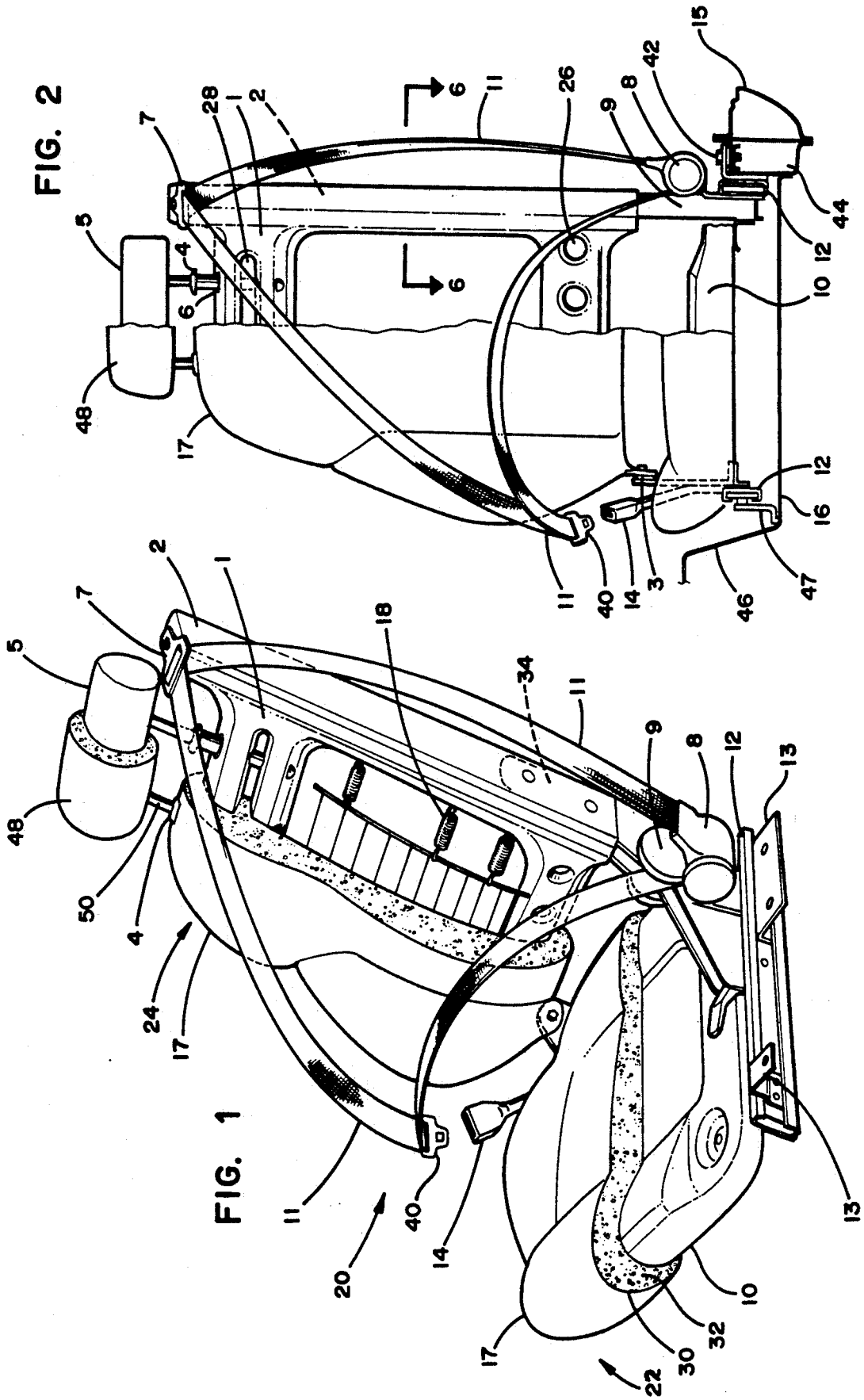

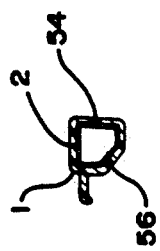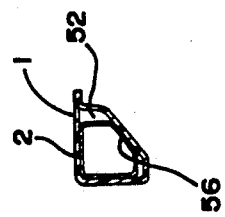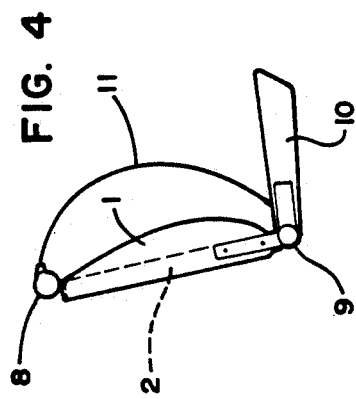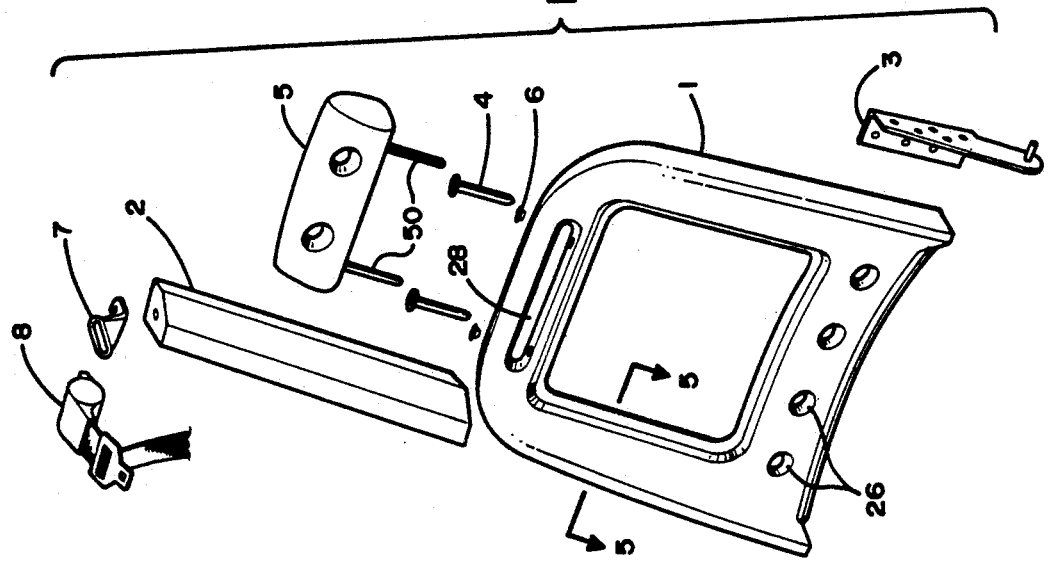

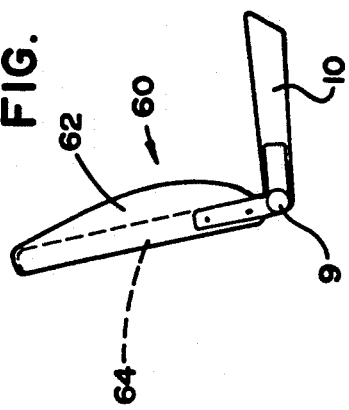
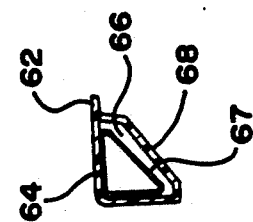
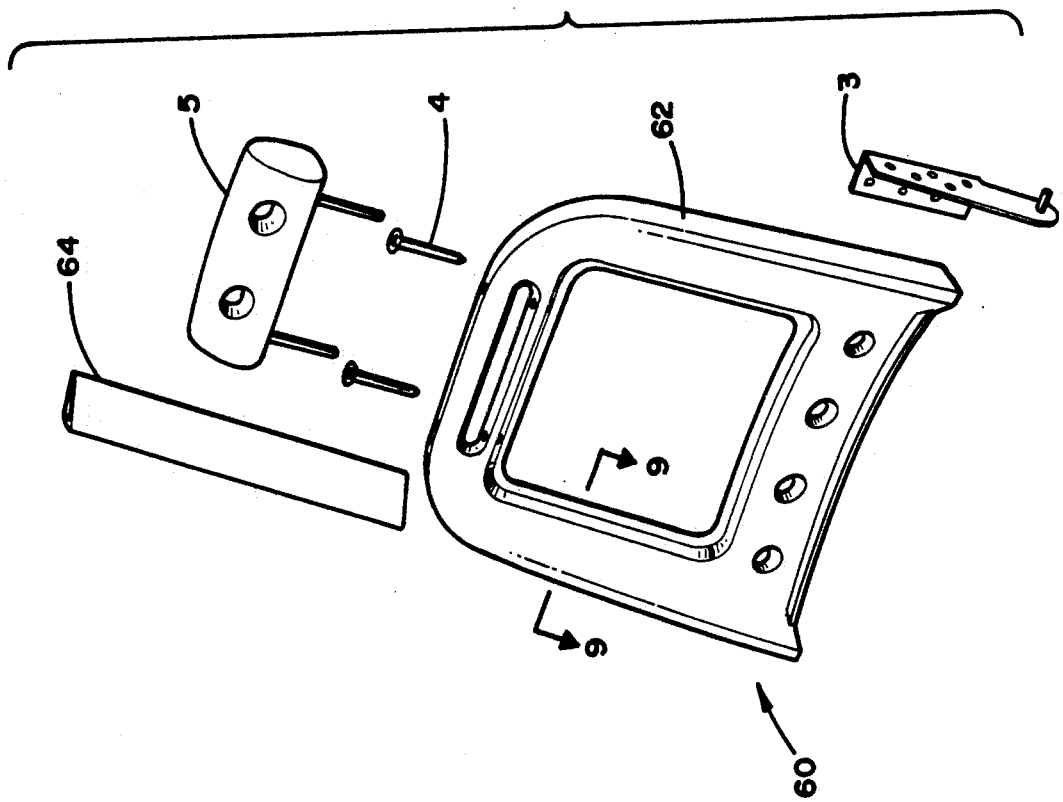

BLOW MOLDED SEAT BACK WITH INTEGRAL REINFORCING MEMBER

BACKGROUND OF THE INVENTION

The present invention relates to vehicle seats and more particularly to an improved seat back for a vehicle front seat.

Seat structures in vehicles such as automobiles are required to meet federal safety standards. These standards are higher for front seat backs than rear seat backs in automobiles, because front seat backs have to be designed to withstand rear occupant impact and rear head form impact. Accordingly, most front seat backs are formed of stamped, die cast, or tubular steel or other metal constructions, although other materials such as expensive resins or composites having a high modulus of elastisity (rigidity) can be used. Such seats are necessarily relatively heavy and/or expensive.

The necessity for high structural strength is increased when seat belts are incorporated into the seat back structure. While most seat belt shoulder harnesses are anchored to the vehicle frame, it is desirable for a number of reasons to anchor the seat belt to the seat back itself. One reason is that the seat belts remain in adjustment when the seat position is changed. Such seat belts also provide an improved fit on the passenger and free the vehicle from design constraints required by placement of a seat belt retractor and "D" ring on the vehicle frame. However, anchoring a front seat shoulder harness on the seat back itself increases the structural requirements of the front seat back, because the front seat back then has to restrain the forward momentum of front seat passenger in an impact.

Because of the high strength requirements of front seat backs, particularly when the seat belt is anchored to the front seat back, front seat backs are usually formed of expensive high strength materials and tend to have a high mass.

Blow molding is a low cost plastic molding technique that has found wide applications in the formation of plastic beverage bottles from high density polyethylene ("HDPE"). The blow molding process involves inflating a heated hollow plastic blank in a closed mold. The process is desirable because it produces a lightweight closed section that has good structural characteristics. However, the normal blow molding process is limited to a maximum molding pressure of about one atmosphere (14.7 psi). This pressure restricts the materials that can be used to thermoplastic materials having a low modulus of elasticity (relatively elastic), such as polyolefins (e.g., HDPE), with low levels of fillers (15% or less) and glass reinforcements. Generally a material having a modulus of elasticity of 500,000 psi or less is considered a low modulus material. Materials with a higher modulus of elasticity, particularly a modulus of 1,000,000 psi or more, are considered high modulus materials. For example, an unfilled HDPE has a modulus of about 170,000 psi, while a filled HDPE has a modulus of about 400,000 psi.

Because of the strength limitations of such materials, the use of blow molding for seat components has been limited to components requiring little structural strength, such as seat pans and rear seat backs. This technique has not been applied to front seat backs.

An object of the present invention is to provide a lightweight, cost efficient front seat back comprising a blow molded thermoplastic body into which a reinforcing member is incorporated, wherein the seat structure complies with applicable safety standards and permits the affixation of a seat belt anchor directly to the seat back.

SUMMARY OF THE INVENTION

In accordance with the present invention, an improved seat back frame for a vehicle seat comprises a blow molded body formed in the shape of a seat back from a thermoplastic resin and a high modulus reinforcing member incorporated into the body. The reinforcing member comprises an elongated member formed of one or a combination of materials including metal, a thermosetting or thermoplastic resin, or a composite material. The reinforcing member extends upwardly from a base of the seat back to a position adjacent an upper portion of the seat back, the reinforcing member being attached to a seat back support mechanism at a base of the seat. The reinforcing member is attached to the body of the seat back so as to provide resistance to forward directed forces on the seat back.

The reinforcing member can be on one or both sides of the seat back. Preferably, the reinforcing member is surrounded by the blow molded body, either by fitting in a closely fitting recess in the reinforcing member or by being integrally molded in the body.

The present invention represents a significant improvement because it permits an inexpensive low modulus blow molded resin to be utilized with a unique reinforcement scheme to create a structural seat back frame. It also permits seat belt anchorage to be attached to the seat and has particular application to automotive bucket and bench seats. The stiffening or reinforcing member preferably is a tube constructed of a material such as steel, aluminum, magnesium, FRP composite, or high modulus thermosetting or thermoplastic resin. One preferred construction is a roll formed martinsite steel reinforcing member with a special shaped constant cross section that inserts into a blow molded back frame after molding the frame from a talc-filled HDPE. The design of the member can be changed to carry normal occupant loads or higher seat belt loads.

A number of variations in the design and construction of the reinforcement member are possible. The reinforcement stiffening member can be external or internal to the blow molding, utilized on one or both sides of the seat and insert molded or attached to the blow molded component after molding.

The seat construction of the present invention transmits all required design forces, yet utilizes inexpensive automotive materials and inexpensive manufacturing processes to create cost-efficient, lightweight seat frames. The end result is increased occupant safety and comfort at low mass and cost, compared to conventional seating.

DESCRIPTION OF THE DRAWINGS

FIG. 1 is a partially cut-away perspective view showing the general construction of a seat incorporating the present invention.

FIG. 2 is a front elevation of the structure illustrated in FIG. 1.

FIGS. 1 and 2 illustrate the seat on the driver's side of the vehicle.

FIG. 3 is a perspective exploded view of the seat back construction on the passenger side of the vehicle.

FIG. 4 is a schematic side view illustration showing the general arrangement of a safety harness on the passenger side of the front seat.

FIG. 5 is a section taken along line 5—5 of FIG. 3.

FIG. 6 is a section taken along line 6—6 of FIG. 2.

FIG. 7 is a perspective exploded view of a second embodiment of the seat back construction on the passenger side of the vehicle, showing the seat without an integral seat belt restraint system mounted directly to the seat mechanism.

FIG. 8 is a schematic side view illustration of the embodiment of FIG. 7.

FIG. 9 is a section taken along line 9—9 of FIG. 7

DESCRIPTION OF THE PREFERRED EMBODIMENT

The seat 20 illustrated in the drawings comprises a base 22 and a seat back 24. Seat back 24 includes a blow molded seat back frame element or body 1 formed in the general configuration of the seat back. Body 1, shown separately in FIG. 3, is a closed, integrally formed hollow member, having integrally formed front and rear sections that are joined together during the molding process at the junction of opposite recesses (called "standoffs") 26 on the lower portion of the body and opposite recesses 28 on the upper portion of the body. The upholstery 17 for the seat is conventional, with a fabric or vinyl or leather material 30 covering a padded substrate 32, as shown in FIG. 1.

The body can be formed from a conventional (and inexpensive) blow molding resin, including one or more of polypropylene, low density polyethylene, high density polyethylene, polycarbonate, and ABS plastic. The material may be filled or unfilled to the extent permitted in blow molding (typically up to about 15%). The wall thickness of the body can be in the typical range of 0.05 to 0.50 inches but normally is about 0.075 inches thick, depending on the material and application. A talc-filled high density polyethylene body having a wall thickness about 0.075 to 0.150 inches is desirable.

A substantially vertical reinforcement beam 2 extends along one side (preferably the vehicle outer side) of the seat back, and is surrounded over most of its length by the molded component 1. The reinforcing beam is accessible from the molded unit through openings in both the top and bottom, with the lower extremity of this beam being secured to the pivot arm 34 of a recliner mechanism 9. A pivot bracket reinforcement 3 (shown in FIG. 3) can be mounted on the inner side of the seat (as shown in FIG. 2) for pivotal mounting of the inner side of the seat back to the back of the seat.

In the embodiment shown in FIGS. 3 and 5, body 1 is formed with an internal recess or passageway 52 in which reinforcing beam 2 fits snugly and is surrounded by the body over most of its length. With such an arrangement, the molded unit 1 can be fitted over the beam 2 and the upper pivot leg 34 of the recliner 9 after the beam has been assembled to the base structure of the seat. Alternatively, the beam 2 can be integrally incorporated into the body 1 during the molding of the body, as shown in FIGS. 2 and 6, in which case an integral opening 54 is molded around the beam, and fasteners are subsequently run through the side extremity of the molded frame and into the beam. Various manufacturing considerations will determine which arrangement is to be used.

As shown in FIGS. 5 and 6, the outer configuration of the beam 2 and the mating openings 52 and 54 are irregular and non-circular in shape. This gives the structure improved torsional resistance to prevent the body 1 from twisting around the beam 2 during impact. Desirably, the beam is rectangular in cross section, with one corner 56 of the beam being beveled to improve passenger comfort.

The upper extremity of the reinforcing beam 2 has a transverse face that forms a mounting point for mounting either the retractor 8 or the plastic coated metal shoulder belt (or "D") ring 7. Harness forces are thus transmitted through one of these components to the beam 2, which functions as a cantilever support transferring forces down to the base structure of the seat.

The beam is preferably formed of a high modulus material with a modulus of 1,000,000 psi or greater. Tubular metals such as steel, aluminum or magnesium are desirable. A roll form martinsite steel having a typical wall thickness of about 0.028 to 0.075 inches and preferably about 0.044 inches is especially preferred. The required strength of the reinforcing beam depends on whether the seat belt retainer is to be mounted on the seat mechanism.

The remainder of the structure illustrated in the drawings is largely conventional, and needs but little modification to accommodate the present invention. The base structure transferring the harness forces (including those from the reinforcement beam 2) to the body structure of the vehicle includes the seat recliner 9 (which includes a pivot latch mechanism), the seat tracks 12, and the riser brackets 13. The usual seat belt latch receptacle 14 is illustrated in FIG. 2 and is attached to the base of the seat at the side opposite the belt retractor. The latch receptacle 14 engages buckle 40 of the combination lap and shoulder belt harness 11. The riser brackets on the outside are bolted by bolts 42 to door sill 44. The rocker section 15 defines the bottom of the door opening outboard of the frame structure to which the seat base is attached. The inboard bracket 47 of the seat support structure can be mounted at the central tunnel section 46 of the vehicle floor. The door sill and tunnel provide a sufficient anchor to hold the seat securely to the floor in an accident. The vehicle floor is indicated at 16 in FIG. 2, and may be considered as part of the frame of the vehicle for stress-transmission purposes. The seat upholstery is indicated generally at 17, and the seat back suspension at 18. The latter, which includes a spring mounted webbing, resiliently supports the back of the seat, and is connected to the molded frame unit 1 across the central opening shown in FIG. 3. At the upper portion of the seat back, the usual head rest structure is indicated at 5 without upholstery in FIG. 3 mounted on rods 50 engaging the sleeves 4 bonded to the molded frame unit, and traversing the grommets 6 for wear resistance, as the head rest is frequently subject to vertical adjustment. The head rest is covered with upholstery 48, as shown in FIG. 1.

Recliner mechanism 9 may be conventional when constructed to transmit the harness forces involved. Recliner mechanism 9 can include a latch mechanism for maintaining the seat at a desired inclination. The opposite side of the seat may also include a recliner latch mechanism or it may employ only a hinged reinforced bracket 3 without a latch. A reinforcing member 2 is not necessary on a side using only a hinge but may well be used on both sides of the seat where the seat is latched at both sides or where the seat is not intended to pivot forwardly.

FIG. 4 presents a schematic illustration of the harness installation, with the harness generally indicated at 11 and the principal lower portion of the seat indicated at 10. The latter is commonly referred to as the seat pan, and is subject to the usual upholstery. This pan is preferably also blow-molded to obtain further low mass and cost.

A second embodiment of a seat construction 60, not employing an integrally mounted seat belt restraint system attached to the seat, is shown in FIGS. 7-9. As in the other embodiment, the construction includes a low modulus blow molded seat back 62 in which a high modulus reinforcing member 64 has been incorporated. Member 64 is triangular or rectangular in cross section and fits in a corresponding opening 66 in the seat back body. An angled or beveled side of the reinforcing member 67 and corresponding beveled section of the opening 68 face the passenger for improved shape and comfort characteristics. The irregular configuration of the member and the opening restraint twisting or torsional stresses exerted on the body around the axis of the reinforcing member. reinforcing member 64 is an open top tube that is somewhat shorter than reinforcing member 2, with the reinforcing member 64 being in the blow molded body portion 62 and not protruding upwardly for seat belt attachment. In this embodiment, the seat belt is anchored to the vehicle frame in the conventional manner.

The rest of the components are the same as in the previous embodiment and employ the same reference numerals for the same components.

The foregoing embodiments represent the preferred practice of the present invention. However, various changes may be made in these embodiments without departing from the spirit and scope of the present invention, as defined in the appended claims.

I claim:

1. A seat back for a vehicle seat comprising a seat back and seat unit mounted on a seat base, the seat back comprising an integral, hollow molded body portion formed in the shape of a seat back from a thermoplastic resin, and a high modulus reinforcing member incorporated into the body, the reinforcing member comprising an elongated member formed of one or a combination of metal, a high modulus resin, or a composite material and extending upwardly from a base of the seat back to a position adjacent an upper portion of the seat back, the reinforcing member being attached to a seat back support mechanism at the base of the seat back, the reinforcing member providing resistance to forward directed forces on the seat back, the reinforcing member having a non-circular cross section and the body comprising an integral hollow, tubular portion that fits closely over the reinforcing member through the body and conforms generally with the shape of the reinforcing member, the engagement of the tubular portion of the body on the reinforcing member resisting torsional forces exerted on the body about the axis of the reinforcing member, the reinforcing member having a generally rectangular cross section, with one corner of the member facing a passenger seating area of the seat being beveled.

2. A seat back according to claim 1, wherein the reinforcing member is integrally molded into the body.

3. A seat back according to claim 1, wherein the body comprises a thermoplastic polyolefin resin.

4. A seat back according to claim 1, wherein the body comprises one or more of low density polyethylene, high density polyethylene, polypropylene, polycarbonate, and ABS plastic.

5. A seat back according to claim 1, wherein the body comprises high density polyethylene having a wall thickness of about 0.075 to 0.150 inches.

6. A seat back according to claim 1, wherein the reinforcing member is positioned at the outer side of the seat back adjacent a vehicle door, the seat back further comprising a shoulder harness seat belt restraining means attached to an upper portion of the reinforcing member, such that a forward force exerted on the seat belt is restrained directly by the reinforcing member.

7. A seat back according to claim 6, wherein the seat belt restraining means comprises a seat belt retraction mechanism mounted at an upper position on the reinforcing member.

8. A seat back according to claim 6, wherein the seat belt restraining means comprises a seat belt retraction mechanism mounted to the seat at the base of the seat back and a belt guide mounted at an upper position on the reinforcing member, the seat belt extending from the retraction mechanism, through the guide and then to a latch mechanism mounted on the opposite side of the seat.

9. A seat back according to claim 1, wherein the reinforcing member comprises a hollow, tubular member formed of steel, aluminum, magnesium, or composite.

10. A seat back frame for a front seat assembly in a motor vehicle wherein the seat back frame is mounted on a generally horizontal seat base, the seat back frame comprising:
a hollow, molded plastic body defining the general configuration of the seat back, the body having an integral hollow tubular portion extending upwardly along one side of the body, the tubular portion having an open interior with a non-circular circular cross-sectional configuration, the tubular portion extending from a lower end of the body to an upper portion of the body;
an elongated reinforcing beam having a non-circular exterior configuration that conforms generally with the non-circular configuration of the interior of the tubular portion of the body, such that the beam fits snugly and non-rotatably on the tubular portion, the beam extending upwardly through the tubular portion and comprising a lower end at the lower end of the body;
means connecting the lower end of the beam to the seat base; and
means connecting a lower end of an opposite side of the body to the seat base.

11. A seat body frame according to claim 10 wherein the hollow body is molded from a low modulus thermoplastic resin, the beam being formed of a high modulus material and provides reinforcement for the body that restrains the body from both forward deflection and rotational deflection around the beam during impact.

12. A seat back frame according to claim 11 wherein the beam and the open interior of the tubular portion have a generally rectangular configuration, with an interior corner of the rectangular beam and tubular portion facing a passenger seating area being beveled.

13. A seat back frame according to claim 10 wherein the body is substantially unreinforced except for the reinforcing beam.

14. A seat back frame as defined in claim 10, wherein the interior opening in the body tubular portion extends to a top end of the body and has an open upper end through which an upper extremity of the beam protrudes, a seat belt restraining means being attached to the upper extremity of said beam.

15. A seat back frame as defined in claim 10, wherein said beam is integrally molded in said body.

* * * * *

UNITED STATES PATENT AND TRADEMARK OFFICE
CERTIFICATE OF CORRECTION

PATENT NO. : 5,253,924
DATED : October 19, 1993
INVENTOR(S) : Patrick M. Glance

It is certified that error appears in the above-identified patent and that said Letters Patent is hereby corrected as shown below:

In claim 10, column 6, line 34, delete the word "circular" before the word "cross-sectional".

In the Abstract, the third sentence, the word "from" should be "form".

Column 1, Line 18, the word "elastisity" should be "elasticity".

Column 5, Line 21, "reinforcing member 64" should be "Reinforcing member 64".

Signed and Sealed this

Sixth Day of June, 1995

Attest:

BRUCE LEHMAN

Attesting Officer  Commissioner of Patents and Trademarks